United States Patent [19]

Fraser

[11] Patent Number: 5,062,205
[45] Date of Patent: * Nov. 5, 1991

[54] METHOD OF MANUFACTURE AND REPAIR OF TURBINE BLADES

[75] Inventor: Michael J. Fraser, Broughton Hackett, England

[73] Assignee: Refurbished Turbine Components Limited, England

[*] Notice: The portion of the term of this patent subsequent to May 23, 2006 has been disclaimed.

[21] Appl. No.: 467,864

[22] Filed: Jan. 22, 1990

[30] Foreign Application Priority Data

Jan. 24, 1989 [GB] United Kingdom ............... 8901482

[51] Int. Cl.⁵ .............................................. B23P 15/04
[52] U.S. Cl. .................................. 29/889.7; 29/889.1; 228/119
[58] Field of Search ............... 29/889.1, 889.7, 402.03, 29/402.07, 402.08, 402.13, 402.16, 428, 527.1, 527.2, 527.4; 416/224; 228/119

[56] References Cited

U.S. PATENT DOCUMENTS 4,563,801  1/1986  Schill et al. ...................... 29/402.07
4,611,744  9/1986  Fraser et al. ...................... 29/889.1
4,832,252  5/1989  Fraser ......................... 29/402.13 X
4,866,828  9/1989  Fraser ............................ 29/889.1

FOREIGN PATENT DOCUMENTS 2091139  7/1982  United Kingdom ............... 29/889.1
2198667  6/1988  United Kingdom ............... 29/889.1

Primary Examiner—Irene Cuda
Attorney, Agent, or Firm—Armstrong, Nikaido, Marmelstein, Kubovcik & Murray

[57] ABSTRACT

A method of manufacturing or repairing a turbine blade includes inserting an insert into the leading edge portion of the blade situate particularly adjacent the radially outer end of the turbine blade. The insert is made of a material different from the parent material of the blade and having a higehr carbon content to enable a piece of material to be satisfactorily hardened by heat treatment, the heat treatment being such that the portion of the insert adjoining the blade is not significantly hardened thereby minimizing or eliminating the likelihood of the formation of cracks in the insert during use of the turbine to which the blade is secured.

16 Claims, 2 Drawing Sheets

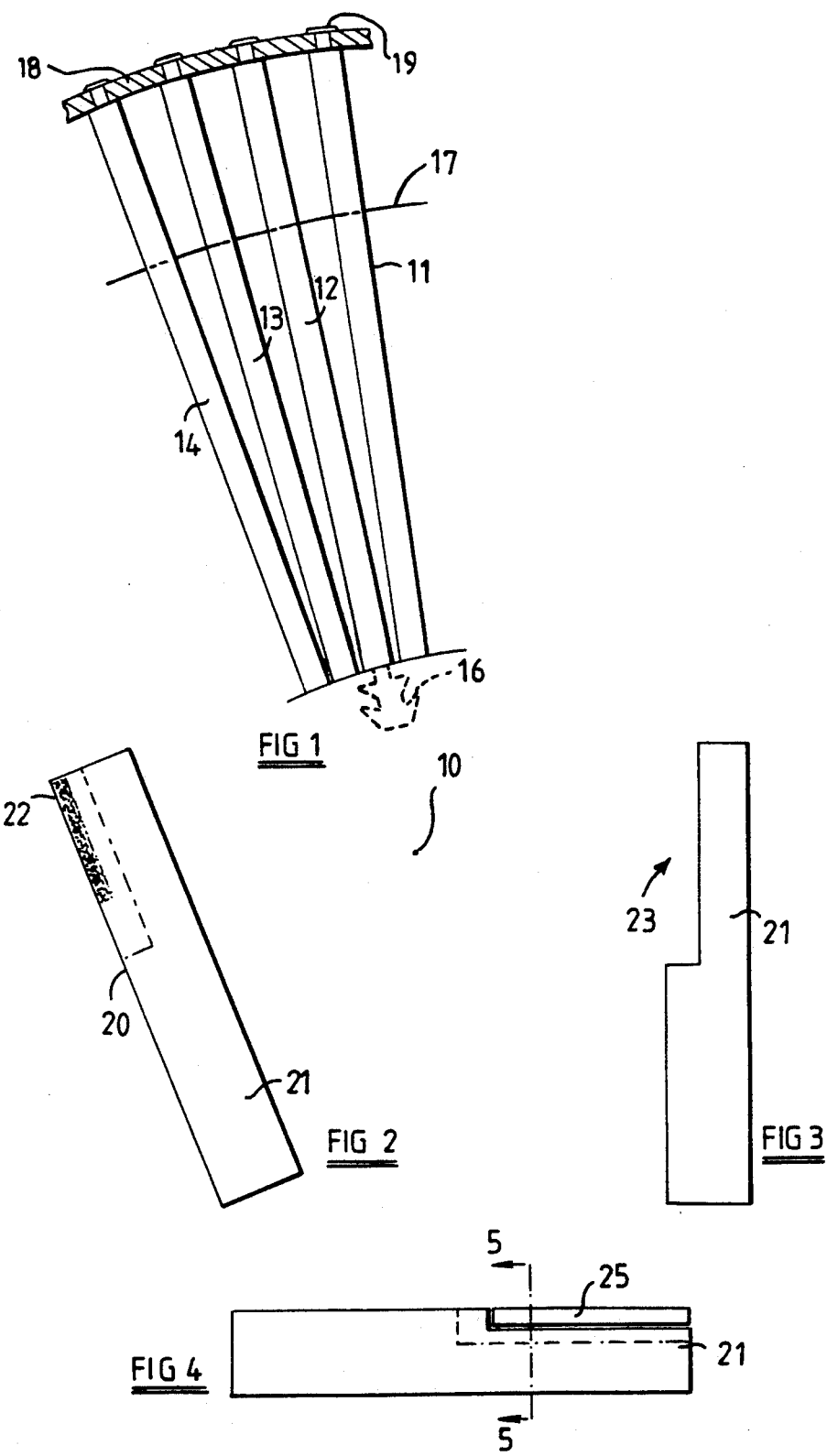

METHOD OF MANUFACTURE AND REPAIR OF TURBINE BLADES

BACKGROUND OF THE INVENTION

1. Field of the Invention

The present invention relates to methods of the manufacture and repair of turbine blades and is primarily concerned with the manufacture and repair of turbine blades that are provided with a durable portion adjacent the outer end of the leading edge.

During operation of a turbine, the blades are subject to several hazzards. The primary hazzard affecting the leading edge of the blades is impact with:

(a) solid particles
(b) water droplets.

Impact with solid particles and water droplets causes erosion to occur in the blade, solid particle erosion occurs in view of solid particles, metallic or chemical, carried over from the boiler, for example, coming into contact with the leading edge of blades situated normally at the early stages of the turbine.

Impact with water droplets can also cause considerable damage to the turbine blades and is more prone to occur in later stages of the turbine. The reason that water droplet damage occurs in the later stages of the turbine is that the steam has cooled compared with its temperature in the high pressure stages and water condenses more readily. The combination of the chemicals in the water and the stresses to which the blades are subjected in use can lead to an effect known as stress corosion cracking, particularly if there is a flaw or transitional weakness present in the blade.

Dense moisture forms in the expanding steam and is transported by the steam. Water particles are, after deposition on portions of the turbine re-entrained with a main steam flow and can collide with the leading edge of the moving blades.

In the case where water is heated by nuclear energy, the temperature of the water is lower than would be the case with, for example, a fossil fuel generating plant and hence the blades in a turbine are more prone to water droplet impact and the aforementioned effect of stress corosion cracking.

Impact with water droplets can cause quite severe damage, there are two effects of the impact that can account for the erosion that takes place:

(1) initially a high pressure intensity between the droplet and the material of the blade:
(2) the high radial flow velocity of the water contained in the droplet after collision.

In order to combat such erosion it is well known to fit a nose or shield of hard material, for example Stellite, to the leading edge of the blades. However the material itself is very expensive and unless perfectly fitted can lead to further problems.

A shield may be attached to a blade by what is known as peripheral welding, peripheral welding can leave a junction of the shield at the radially outermost position where no weld material is present and a cavity or thin gap can exist under the shield. If water penetrates this gap considerable damage can occur, including delamination of the shield from the blade and/or the formation of cracks in the blade.

A Stellite shield may be attached to a blade by welding or by brazing. Welding provides for a stronger or better attachment of the shield to the blade particularly where the shield is in a form of a "nose" of the blade.

When a Stellite shield is attached to a blade by brazing, if there are any voids in the braze the shield may easily become dislodged due to the flexing of the blade during operation with consequential damage to adjacent blades and/or tubes in the condensor which follows the low pressure stage of a turbine.

Additionally, when the braze is onto nickel (where a part of the blade has been nickel plated) the braze and nickel plate can become delaminated due to water entering the void by capillary action and subsequent deliterious affects to the joint.

The heat generated during the welding of the Stellite shield to the blade makes it essential for critically controlled preheat and subsequent heat treatment of the blade after the welding operation to minimise any concentrations of stress. It is usually recommended that such repairs are carried out after the blade has been removed from the rotor under very carefully controlled conditions.

2. Prior Art

Japanese patent application 1969 162010 discloses a turbine blade in which a piece of the leading edge of the blade at the outer end is removed and a piece of material the same as that of the parent material of the blade is then welded to the blade and subsequently hardened by flame hardening. The above mentioned Japanese patent application mentions specifically a 12% chrome steel as one of the steels from which the blade may be made. However, the carbon content of the steel is not mentioned. If the carbon content is relatively low, for example 0.1%, then the hardening achieved by flame hardening may be insufficient to provide any real protection against erosion of the blade during use.

If the blade and insert is made of a higher carbon material, then a greater degree of hardness may be achieved. However it is undesirable to manufacture turbine blades, in particular turbine blades used in the low pressure or wet end of a turbine, from a hard material.

There are however considerable problems in producing the blade as a whole from hard material in that the blade is considerably less ductile than a blade made from the more normal 12% chrome steel with fairly low carbon content. A high carbon content in the blade can increase the chances of the occurrence of stress corosion cracking, particularly where a blade is at a low pressure or wet end of the turbine and in the regions of the blades where a discontinuity, such as lacing wire holes or cover band slots occur. This problem has been recognised with the result that the blade is sometimes thickened in such areas. This obviously leads to greater expense in manufacture and a reduction in the "throat gap" between one blade and another with consequential loss of efficiency.

Since the material of the insert is substantially the same as the material of the blade, if cracks occur to the leading edge due to impact with some foreign material, then the crack can develop across the blade in view of the hardness of the material as a whole.

The normal material, e.g. 12% chrome steel, from which turbine blades are commonly made, in particular those in the low pressure end of a steam turbine, is not a particularly hard material since the blades have to be provided with discontinuities such as lacing wire holes, whereby the blades in a rotor may be joined together with a lacing wire. If a hard material was used, the presence of such discontinuities could easily lead to the formation of cracks in use of the turbine and hence a comparatively short service life.

British patent application 8630502 (Publication No. 2,198,667), which corresponds to U.S. Pat. No. 4,832,252, issued May 23, 1989, discloses a method of repairing a turbine blade in which a piece of material is removed from the blade and an insert is secured thereto by welding, the insert being made from a material which has a part compatible with that of the material of the turbine blade and another part of high durability which forms the leading edge of the turbine blade once the insert is secured thereto.

Where the insert can be prepared under controlled conditions a highly satisfactory result can be achieved providing care is taken during securing of the insert to the blade and in subsequent heat treatment of the area affected by the weld.

SUMMARY OF THE INVENTION

It is an object of the present invention to provide a new and improved method of manufacturing or repairing a turbine blade.

According to one aspect of the present invention, we provide a method of manufacturing a turbine blade comprising the steps of:

(a) forming the turbine blade with a leading edge and a trailing edge from a first material, the turbine blade having a radially inner end and a radially outer end;

(b) forming a metallic insert for attachment to said turbine blade, said insert being formed from a material having a higher carbon content than the material from which the turbine blade is made;

(c) welding said insert to said turbine blade;

(d) applying heat to a part of said insert so as to cause hardening of said insert at least where said insert forms a part of said leading edge of the turbine blade, said heat being applied in a manner such that the hardening does not fully extend as far as the junction between the insert and said blade so that there exists adjacent the boundary with the remainder of the blade a portion of said insert of substantially unhardened material.

Said insert extends along a part of the length of the blade and preferably across the blade by an amount greater than the area which has to be hardened so that after the hardening has been carried out, an area of said insert is relatively unaffected by said hardening process thereby minimising any adverse affect to a welded joint by means of which the insert is secured to the blade.

Preferably, said hardening comprises induction hardening but may alternatively comprise flame hardening or any other suitable process and preferably that part of said insert adjoining the remainder of the blade and the weld material by means of which the insert is secured to the blade is left in an unhardened state.

The provision of the high carbon content of the insert compared with the remainder of the blade permits of a greater hardening than would otherwise have been the case if the insert was made from a low carbon steel similar to a blade material. The material of the blade is otherwise compatible or similar to the parent material the insert is relatively easily welded or otherwise secured to the blade without the necessity of excessively high welding temperatures which can cause distortion and other heat effected problems in the blade.

A further advantage of the material used is that in view of the high carbon content and its relative hardness the blade is durable and whereas similar or even greater durability can be provided with a Stellite shield, for example, such materials have a high cobalt content and the use of such material is undesirable in turbines that may come into contact with nuclear radiation due to a long radiation half life of cobolt.

According to another aspect of the present invention, we provide a method of manufacture wherein said blade is subjected to a heat treatment process after said hardening process to relieve any stress caused during the securing of said insert to said blade.

Preferably, the insert is of sufficient size to ensure that material affected by welding during the joining of the insert to the blade does not need to be hardened during the hardening of the leading edge part of the insert.

Following the repair as described above, the blade may be subjected to a heat treatment process to relieve any stress caused by the welding operation and indeed new turbine blades as described above will also be subject to heat treatment processes.

The weld material may be selected so as to provide a cushion between the insert and the blade itself to prevent or minimise the propogation of any cracks occurring in the hardened insert to the blade itself. Propogation of such cracks will to a large extent be eliminated or reduced in view of the transition of the hardened part of the insert to the less hardened part of the insert, i.e. that part relatively unaffected by the hardening process, before the boundary before the insert and the blade.

If a relatively soft weld material is used, whereas this has considerable benefits during the securing of the insert to the blade in a reduced temperature as possible during the welding process, compared with the welding using hard weld material, the soft material may provide a line of weakness at the exposed surface of the weld would itself be subjected to erosion since it is softer than either the material of the insert or the material of the blade itself.

It is envisaged therefore that a small bead of relatively hard material may be provided which provides a mere surface covering to the soft weld material and hence does not adversely affect the joint between the insert and the blade but merely protects the weld material from erosion.

By providing an insert which is considerably larger than would normally be used, enables the insert to have a border of material which is not hardened to the same extent and take the weld area away from the leading edge of the blade and hence direct droplet impingement. The weld line of the insert to the blade is not only kept well away from the subsequently hardened part of the blade but the weld line is also removed from the leading edge of the blade by a substantial margin and avoids or reduces the highest velocity impingement of water droplets.

A potential weakness therefore, i.e. of the weld between the insert and the blade, is kept well away from the area of the blade that is most prone to attack, i.e. the leading edge part.

It is further envisaged in view of the desirability to maintain any joint between an insert and the remainder of the blade well away from the areas of the blade that are most prone to attack, to extend the length of the insert from the radially outermost part of the blade in a direction towards the root longer than would normally be the case so that the weld area which is situate on the leading edge of the blade, i.e. the radially innermost part of the insert, is situate sufficiently near the root so that the likelihood of damage occurring in such region is minimal.

It is further envisaged that the insert may be provided with grooves or other indentations of a form that, in use, will accommodate liquid to maintain liquid on that part of the blade which acts as a cushion if the blade is subjected to impact from water droplets or other matter, such a feature further enhancing the life expectancy of the blade. As an alternative to grooves or indentations, ridges or other upstanding surface parts may be provided, such upstanding surface parts also having the intention to maintain a layer or film of water over at least the leading edge of the blade, i.e. the area most prone to damage.

The blade may typically be made from a 12% chrome steel which may include approximately 0.1% carbon.

The insert may also be made from a chrome steel in which the chromium content may be a little higher than that of the parent material, for example 13% to 14% but in which the carbon content is preferably approximately twice as much as that of the parent material, for example 0.2%, this will permit of a considerable increase in the hardness of the material after treatment, for example induction hardening or flame hardening, compared with the hardness that could have been achieved with material the same as from which the blade is made.

It has been found that another suitable material from which the insert may be made is a tool steel which is characterised by having a high carbon content, e.g. 0.75%. In a typical tool steel the chromium content will be less than the chrome content in a normal turbine blade. However, the tool steel is also characterised by having a high tungsten content.

Even though the increase in carbon permits of considerably improved hardening of the insert compared with that would have been possible with blade material, the material itself is still highly compatible with the blade material and providing at least a part around its edge is relatively unaffected by the hardening process, the insert may be joined to the blade without undue difficulty.

The method of repair lends itself to "in situ" repairs, that is repair to turbine blades without the necessity of removing the blade from a rotor for example since damaged material may be easily removed therefrom and a new piece of high carbon content material welded thereto and after grinding or other surface finishing, that part of the insert spaced from the boundary with the blade may be subjected to a hardening process, for example induction hardening or flame hardening, the remainder of the inserts weld and adjoining part of the blade being masked or otherwise protected from the hardening process.

The ability to carry out repairs on turbine blades without removing the blade from the rotor not only enables a much faster repair to be made but also eliminates possible damage being caused to the blade or rotor during removal or re-fitting to the rotor.

It is envisaged as aforementioned that the present method is equally applicable to the manufacture of new blades as it is to the repair of existing blades.

According to a still further aspect of the invention, we provide a turbine blade having a leading edge region wherein at least a part of said leading edge region proximate to the radially outermost end of the blade is provided with an insert of a material different from the material from which the turbine blade is made, said material having a higher carbon content than the blade material, said insert being secured to the blade by welding and wherein subsequent to securement to said blade a part of said insert is hardened such that the part of said insert affording a leading edge region of said blade is hardened and wherein the region of said insert adjacent to the remainder of the turbine blade is substantially unaffected by said hardening.

The invention will now be described with reference to the repair of a turbine blade and it will be understood that the same steps are equally applicable to the manufacture of a turbine blade, with the exception that the blade could be originally formed with the cut-out ready to receive the insert or if desired the blade could be formed in its novel form and a piece subsequently removed prior to securement of the insert.

A method of repair will now be described by way of example only with reference to the accompanying drawings wherein:

BRIEF DESCRIPTION OF THE DRAWINGS

FIG. 1 is a diagrammatic view showing part of a turbine rotor

FIG. 2 shows a blade which has been subject to impact or erosion damage;

FIG. 3 shows the blade of FIG. 2 from which a piece of material has been removed;

FIG. 4 is a view of the blade shown in FIG. 3 in which a new piece of material has been welded thereto;

DESCRIPTION OF THE PREFERRED EMBODIMENTS

Figure 5:
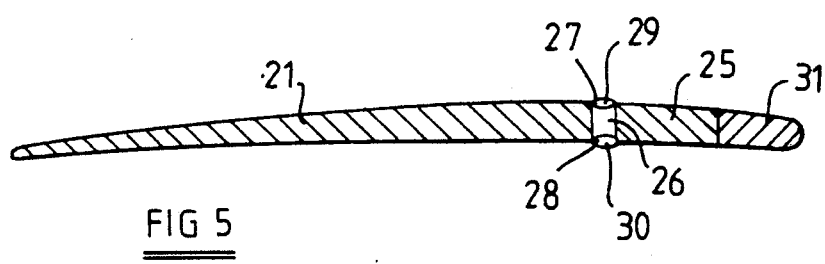
FIG. 5 is a sectional view on the line 5—5 in the FIG. 4.
Figure 6:
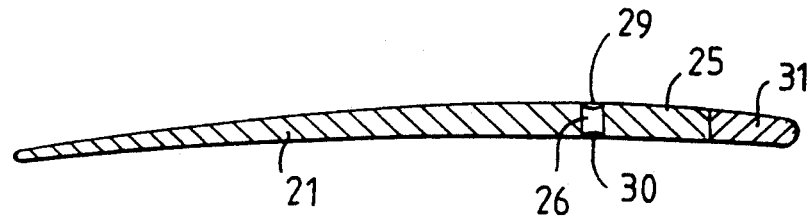
FIG. 6 shows the extent of hardening to the leading edge of the blade.

Referring first to FIG. 1, a segment of the turbine rotor is shown, the rotor having a rotational axis 10 and a plurality of rotor blades, some of which are shown at 11 to 14.

Each turbine blade 11 to 14 is secured to the rotor shaft by a root portion e.g. a root formed on blade 11 shown at 16 and depending upon the length of the blades other restraining means may be provided such as a lacing wire 17 which passes through aligned apertures in each of the blades 11 to 14 and in some cases a shroud 18 may be provided which is secured to each blade through the co-operation of a tennon, e.g. tennon 19 on blade 11, which extends from the outer end of the blade 11 through an aperture in shroud 18 and is subsequently peened over to firmly secure the blade 11 to the shroud 18.

The whole structure therefore of the rotor is relatively secure which makes dismantling the rotor to remove blades a very time consuming and costly process. Generally speaking in the past repair of turbines, or at least satisfactory repair, has to be carried out by dismantling the blades and returning them to the place of manufacture for repair, techniques are now being developed for providing satisfactory repairs to turbines while the blades remain in situ on the rotor or stator.

Referring now to FIG. 2, a blade is shown in isolation for convenience of illustration only in which the leading edge 20 of the blade 21 is shown to have considerable erosion and cracks in the outer edge region 22.

It is the outer leading edge of the blade that is most prone to such erosion since in practice it's linear speed is considerably greater that the linear speed of the parts of the blade in proximity to the rotor shaft.

To begin the repair process, a piece of the blade is removed by cutting or grinding. The part of the blade removed, which can be seen in FIG. 3, ensuring that not only all the obviously visually damaged edge part of the blade is removed but since hairline cracks can extend some considerable way from an impact site it is ensured that sufficient material is cut away from the blade so that the part of the blade remaining should be completely free from any damage.

The piece of the blade cut away may leave a cut-out such as the one shown at 23 in FIG. 3.

A new preformed piece of high carbon content material 25 is then accurately positioned in place and welded to the blade 21. The material when it is affixed to the blade 21 is not hardened and apart from the high carbon content is compatible with the material from which the blade 21 is formed which is commonly a 12% chrome steel.

For example, a typical blade material may comprise a steel having the following elements by percentage:

| Element | |
|---|---|
| Carbon | .09–.13 |
| Manganese | .70 Max |
| Phosphorus | .030 Max |
| Sulphur | .030 Max |
| Silicon | 0.50 Max |
| Nickel | 0.60 Max |
| Chromium | 11.50–13.00 |
| Molybdenum | 0.40–0.80 |

The material from which the insert may be made may again comprise a chrome steel in which the elements are in the following proportions by percentage:

| Element | % Min. | % Max |
|---|---|---|
| Carbon | 0.17 | 0.22 |
| Manganese | 0.30 | 0.80 |
| Phosphorus | — | 0.030 |
| Sulphur | — | 0.020 |
| Silicon | 0.10 | 0.50 |
| Nickel | 0.30 | 0.80 |
| Chromium | 13.00 | 14.00 |

It has been found that with such blade material and such insert material a leading edge portion at the outer end of a turbine blade may be provided which after hardening provides a durable shield or nose to the blade and has the additional benefit of not only being relatively easy to secure to the blade but also being cobalt free and hence highly suitable for use in turbines in a nuclear environment.

As an alternative to the high carbon chrome steel mentioned above, a tool steel may be used, for example a tool steel having elements in the following proportion by percentage:

| Element | |
|---|---|
| Carbon | 0.75% |
| Chromium | 4.3% |
| Vanadium | 1.1% |
| Tungsten | 18% |

The weld material 26 (FIG. 5) may be a soft weld material which, contrary to the expectation that a weak joint would be formed, has unexpected benefits in that it acts as a cushion or shock absorbing element so that if the new piece of material is subjected to impact, which is bound to occur in use of the blade, any crack or damage caused to the hardened material of the insert is not transmitted to the remainder of the blade. It has been found that the cracks are most reluctant to cross the soft barrier caused by the soft weld material 26. It is believed therefore that the soft weld layer 26 acts as a cushion which not only prevents or minimises the propagation of cracks from the new piece of material 25 to the blade 21, but also may reduce the shock damage to the new piece of material 25 itself when subjected to impact.

Depending upon the severity of the use to which the turbine is to be put, it may be that the soft weld material 26 would in the areas shown at 27 and 28 provide a line of weakness that could be subject to erosion in view of the soft nature of the weld material 26. It is proposed therefore that beads 29 and 30 of relatively hard material are placed on the blade over the soft weld 26 to provide a shield against erosion.

The beads 29 and 30 will be relatively thin since their purpose is not to connect the new piece of material 25 to the existing blade 21 but merely to provide an erosion shield to the soft weld material 26.

Excess weld material may then be removed by grinding, polishing or other treatment to return the blade to its original profile and, the nose portion 31 is then hardened by any suitable hardening process, for example induction hardening. The hardening is carefully controlled to ensure that a sufficient amount of the nose portion 31 is hardened so as to combat erosion with impact with particles or water droplets. However the hardening does not extend as far as the junction provided by the soft weld material 26 since interferring with the junction could adversely affect the strength of the joint between the new part 25 and the existing blade 21.

It has been found that the repair step of the present invention can be satisfactorily carried out while the blades remain in situ on a rotor or stator and the complications that have in the past arisen through the securing of Stellite shields to blades does not arise, whilst the repair process still gives a satisfactorily hardened edge region to the blade to combat erosion.

Heat treatment processes will be necessary during the repair of the blade and in order not to submit the blade to excessive thermal shock it is envisaged that preheating before any welding is carried out will be necessary followed by stress relieving heat treatments after the welding has been carried out. It is also envisaged that carefully controlled heating during the welding is also carried out since this will have the effect of eliminating temperature gradients across the blade which themselves are known to cause inbuilt stress which can lead to an unexpected fracture of the blade in use.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or any combination of such features, be utilised for realising the invention in diverse forms thereof.

I claim:

1. A method of manufacturing a turbine blade comprising the steps of:
   (a) forming the turbine blade with a leading edge and a trailing edge from a first material, the turbine blade having a radially inner end and a radially outer end;

(b) forming a metallic insert for attachment to said turbine blade, said insert being formed from a material having a higher carbon content than the material from which the turbine blade is made;

(c) welding said insert to said turbine blade; and (d) applying heat to a part of said insert, after welding said insert to said turbine blade, so as to cause hardening of said insert at least where said insert forms a part of said leading edge of the turbine blade, said heat being applied in a manner such that the hardening does not fully extend as far as the junction between the insert and said blade so that there exists adjacent the boundary with the remainder of the blade a portion of said insert of substantially unhardened material.

2. A method of manufacture according to claim 1 wherein said blade is subjected to a heat treatment process after said hardening process to relieve any stress caused during the securing of said insert to said blade.

3. A method of manufacture according to claim 1 wherein said hardening process comprises induction hardening.

4. A method of manufacture of a turbine blade according to claim 1 wherein said hardening process comprises flame hardening.

5. A method of manufacture according to claim 1 wherein said insert is welded to the blade and said weld material is softer than the material of the insert or the turbine blade.

6. A method of manufacture according to claim 5 wherein a layer of hard weld material is provided over said soft weld material.

7. A method of manufacture according to claim 1 wherein said insert is provided with grooves or other indentations of a form to accommodate liquid or maintain liquid on that part of the blade during use of the blade in a stream turbine.

8. A method of manufacture according to claim 1 wherein the carbon content of the material of the insert is greater than 0.15%.

9. A method of repairing a turbine blade comprising the steps of:

(a) removing at least a portion of the leading edge of a turbine blade to be repaired;

(b) forming a metallic insert for attachment to said turbine blade, said insert being formed from a material having a higher carbon content than the material from which the turbine blade is made;

(c) welding said insert to said turbine blade; and (d) applying heat to a part of said insert, after welding said insert to said turbine blade, so as to cause hardening of said insert at least where said insert forms a part of said leading edge of the turbine blade, said heat being applied in a manner such that the hardening does not fully extend as far as the junction between the insert and said blade so that there exists adjacent the boundary with the remainder of the blade a portion of said insert of substantially unhardened material.

10. A method of repair according to claim 9 wherein said blade is subjected to a heat treatment process after said hardening process to relieve any stress caused during the securing of said insert to said blade.

11. A method of repair according to claim 9 wherein said hardening process comprises induction hardening.

12. A method of repair of a turbine blade according to claim 9 wherein said hardening process comprises flame hardening.

13. A method of repair according to claim 9 wherein said insert is welded to the blade and said weld material is softer than the material of the insert or the turbine blade.

14. A method of repair according to claim 13 wherein a layer of hard weld material is provided over said soft weld material.

15. A method of repair according to claim 9 wherein said insert is provided with grooves or other indentations of a form to accommodate liquid or maintain liquid on that part of the blade during use of the blade in a stream turbine.

16. A method of repair according to claim 9 wherein the carbon content of the material of the insert is greater than 0.15%.

* * * * *